US012733569B1

(12) United States Patent
Bo et al.

(10) Patent No.: US 12,733,569 B1
(45) Date of Patent: Sep. 15, 2026

(54) METHOD FOR RAPIDLY INCREASING ORGANIC MATTER IN SALINE-ALKALI LAND BY COMBINING PLANTING AND BREEDING

(71) Applicants: Shandong Academy of Agricultural Sciences, Jinan (CN); National Center of Technology Innovation for Comprehensive Utilization of Saline-Alkali Land, Dongying (CN)

(72) Inventors: Luji Bo, Jinan (CN); Yan Li, Jinan (CN); Zhaohui Liu, Jinan (CN); Liang Dong, Jinan (CN); Deshui Tan, Jinan (CN); Tongshuai Xu, Jinan (CN); Shipeng Lou, Jinan (CN); Yanqin Wang, Jinan (CN)

(73) Assignees: Shandong Academy of Agricultural Sciences, Jinan (CN); National Center of Technology Innovation for Comprehensive Utilization of Saline-Alkali Land, Dongying (CN)

( * ) Notice: Subject to any disclaimer, the term of this patent is extended or adjusted under 35 U.S.C. 154(b) by 0 days.

(21) Appl. No.: 19/249,746

(22) Filed: Jun. 25, 2025

(30) Foreign Application Priority Data

Apr. 17, 2025 (CN) ......................... 202510483986.0

(51) Int. Cl.
*A01B 79/02* (2006.01)
*A01C 21/00* (2006.01)
*C05F 3/00* (2006.01)

(52) U.S. Cl.
CPC ............ *A01C 21/005* (2013.01); *A01B 79/02* (2013.01); *C05F 3/00* (2013.01)

(58) Field of Classification Search
CPC ..... A01C 21/00; A01C 21/005; A01C 21/007; A01C 23/027; A01B 79/02; A01B 79/00
USPC .................................................... 47/58.1 SC
See application file for complete search history.

(56) References Cited

FOREIGN PATENT DOCUMENTS

| | | | | | |
|---|---|---|---|---|---|
| CN | 104272953 | A | * | 1/2015 | A01G 13/33 |
| CN | 105917784 | A | * | 9/2016 | A01B 79/005 |
| CN | 106304877 | A | * | 1/2017 | C05G 3/80 |
| CN | 107646560 | A | * | 2/2018 | A01B 79/02 |
| CN | 109804862 | A | * | 5/2019 | A01C 21/00 |
| CN | 110073758 | A | * | 8/2019 | A01B 79/02 |
| CN | 113170703 | A | * | 7/2021 | A01C 7/008 |
| CN | 114766292 | A | * | 7/2022 | A01G 22/00 |
| CN | 115250655 | A | * | 11/2022 | C05F 3/00 |
| CN | 117598060 | A | * | 2/2024 | A01B 79/02 |
| CN | 118415035 | A | * | 8/2024 | A01C 21/005 |
| CN | 119096840 | A | * | 12/2024 | A01G 13/00 |

OTHER PUBLICATIONS

CN 117598060 A (Year: 2024).*
CN 105917784 A (Year: 2016).*
CN 106304877 A (Year: 2017).*
CN 109804862 A (Year: 2019).*

* cited by examiner

*Primary Examiner* — Son T Nguyen

(57) ABSTRACT

The present disclosure relates to a method for increasing organic matter in saline-alkali land by combining planting and breeding. The method specifically includes the following steps: step 1: sowing green manure plants; step 2: grazing livestock; step 3: preparing a homemade organic fertilizer; step 4, continuing to plant green manure crops and graze livestock. The present disclosure deeply integrates green manure planting, livestock grazing and organic fertilizer preparation by constructing a planting and breeding circulation system, thereby solving the problems of insufficient organic matter input, long improvement cycle, high cost and great ecological risk, etc. in the existing technologies.

10 Claims, No Drawings

METHOD FOR RAPIDLY INCREASING ORGANIC MATTER IN SALINE-ALKALI LAND BY COMBINING PLANTING AND BREEDING

CROSS-REFERENCE TO RELATED APPLICATION

This application claims priority of Chinese Patent Application No. 202510483986.0, filed on Apr. 17, 2025, the entire contents of which are incorporated herein by reference.

TECHNICAL FIELD

The present disclosure belongs to the technical field of saline-alkali land improvement and relates to a method for rapidly increasing organic matter in saline-alkali land by combining planting and breeding.

BACKGROUND

Saline-alkali land is generally unsuitable for agricultural planting due to the excessive salts and alkaline substances in the soil. By improving saline-alkali land, the inhibitory effect of soil salinity and alkalinity on crop growth can be reduced, converting it into cultivable land, enhancing land productivity, improving crop yield and quality, and thus increasing the supply of food or other crops.

At present, common methods for improving saline-alkali land include the following: 1) Physical improvement methods, such as deep plowing, guest soil replacement, and drainage for salt washing. Although physical improvement methods are simple to operate and environmentally friendly, they can only reduce salt concentration but cannot solve the problem of organic matter deficiency. Moreover, mechanical deep plowing or guest soil replacement requires a large amount of human and material resources and needs to be repeatedly operated to maintain the effect; 2) Chemical improvement methods, such as applying gypsum, phosphogypsum, humic acid, etc., to neutralize salinity and alkalinity. Although chemical improvement methods are quick-acting, excessive application of chemical improvers may disrupt the soil ion balance, cause soil compaction, and face the problem of secondary pollution due to excessive chemical substances seeping into groundwater; 3) Biological improvement methods, such as planting salt-tolerant green manure or salt-tolerant crops. Although this method can increase soil organic matter content and is environmentally friendly, it requires multiple growing seasons to take effect, with low efficiency. Additionally, relying solely on the return of green manure plant residues to the field without combining animal husbandry results in limited organic matter input and fails to form efficient cyclic utilization of organic waste; 4) Water conservancy engineering methods, such as constructing irrigation and drainage systems to leach salts. This method requires a large amount of fresh water for flushing, making it unsuitable for arid or water-scarce areas. The construction and long-term maintenance of irrigation and drainage systems are costly, and they may cause soil nutrient loss.

Therefore, it is an urgent problem to provide a saline-alkali land improvement method that is efficient, environmentally friendly, and can significantly improve soil structure and increase soil organic matter content.

SUMMARY

In order to solve the above problems, the present disclosure provides a method for rapidly increasing organic matter in saline-alkali land by combining planting and breeding, which specifically includes the following steps:

step 1, ploughing the land to a depth of 35-45 cm, then furrowing and ridging, forming ridges with a height of 15-25 cm and a width of 55-65 cm; then sowing green manure plant seeds at a depth of 3-4 cm with a sowing rate of 8-10 kg/mu;

during ploughing, applying 20-30 kg/mu of a soil conditioner, 200-300 kg/mu of a homemade organic fertilizer, and 15-25 kg/mu of a base fertilizer into the soil; at 40-45 days after sowing, applying 30-40 L/mu of a salt-tolerant foliar fertilizer by spraying;

step 2, grazing at a rate of 3-5 cattle/mu and 5-7 sheep/mu when a plant height is 40-50 cm. During grazing, providing fresh green manure to account for 60%-70% (v) of the daily ration of cattle and sheep, while supplying feed to constitute 30%-40% (v) of the daily ration; collecting cattle and sheep feces; terminating the grazing when the plant height is 10-20 cm, and resuming when the plant height is 40-50 cm, continuing until the harvesting stage of green manure; at harvest, collecting the straw for subsequent use, and leaving the root stubble in place at a height of 10-20 cm and applying into the soil by ploughing to a depth of 20-30 cm;

step 3, mixing the green manure straw, cattle and sheep feces, calcium superphosphate, ferrous sulfate and composite bacterial agent in a mass ratio of 50:50:4:2:1, fermenting the mixture at 55-65° C. for 20-30 days, during the fermentation, turning the pile 3-4 times; when the moisture content is ≤35% and C/N is ≤50%, the fermentation is completed to obtain a homemade organic fertilizer;

step 4, rotating green manure crops and continuing to graze cattle and sheep.

Preferably, the green manure plant used in the step 1 is selected from one or more of a group consisting of *Astragalus sinicus, Vicia villosa, Trifolium* spp., *Lolium perenne, Sesbania cannabina, Medicago sativa*, and *Vulpia myuros.*

Preferably, in the step 1, mixing the green manure plant seeds with a seed accelerator in a mass ratio of 1:4 before sowing, and soaking at 30-40° C. for 5-7 h, most preferably, the seed accelerator is an aqueous solution of calcium chloride with a mass concentration of 0.2%-0.3%.

Preferably, the soil conditioner used in the step 1 includes humic acid, phosphogypsum, biochar and citric acid in a mass ratio of 2:1:5:2.

Preferably, in the step 1, applying a topdressing fertilizer at a rate of 10-15 kg/mu 20-30 days after sowing, most preferably, the topdressing fertilizer is potassium sulfate.

Preferably, the base fertilizer used in the step 1 is 15-15-15 compound fertilizer.

Preferably, the salt-resistant foliar fertilizer used in the step 1 includes calcium chloride, potassium dihydrogen phosphate, ferrous sulfate, and water in a mass ratio of 1:2:0.5:1000.

Preferably, in the step 1, conducting the irrigation at 7 days after emergence with 10-15 $m^3$ of water/mu, and conducting additional irrigations at 20 days and 40 days after emergence respectively, with 20-30 $m^3$ of water/mu.

Preferably, the feed in the step 2 includes corn meal, soybean meal, wheat bran, and bone meal in a mass ratio of 10:2:4:2.

Preferably, in the step 3, the composite bacterial agent is an EM bacterial agent.

The present disclosure has the following advantages:

(1) The present disclosure establishes a circular system integrating planting and breeding by collecting livestock manure during grazing and combining it with green manure straw fermentation for fertilizer production. This system follows the sequence of green manure planting→grazing→manure collection→organic fertilizer preparation→field application, achieving efficient organic matter input and resource recycling. It reduces reliance on external fertilizers and significantly increases organic matter sources, addressing the issue of traditional biological improvement methods that depend solely on green manure incorporation, which results in a single, slow-accumulating source of organic matter.

(2) The present disclosure mixes green manure straw, livestock manure, calcium superphosphate, and ferrous sulfate for fermentation, significantly enhancing fertilizer efficiency. Combined with a soil conditioner formulation including humic acid, biochar, and citric acid, the synergistic effect of these components improves both the structure of saline-alkali soil and its organic matter content. This approach avoids the environmental pollution and organic matter deficiency caused by excessive reliance on chemical conditioners.

(3) The present disclosure employs dynamic grazing management, reducing livestock dependence on feed while preventing overgrazing of roots. This ensures the regenerative capacity of green manure, addressing the issue of traditional grazing practices that often lead to excessive foraging and damage to vegetation regrowth.

(4) The present disclosure comprehensively combines salt-resistant foliar fertilizer, physical tillage improvement, and precise water regulation to remediate saline-alkali soil in a multi-dimensional manner, avoiding the limitations of single-method approaches that fail to address the multiple challenges of saline-alkali soils.

DETAILED DESCRIPTION OF EMBODIMENTS

The technical solutions in the embodiments of the invention are described clearly and completely below. Obviously, the described embodiments are only a part of embodiments of the present disclosure, and are not all of embodiments thereof. All other embodiments obtained by persons of ordinary skill in the art based on the embodiments of the present disclosure without creative efforts shall fall within the protection scope of the present disclosure.

Example 1

At step 1, green manure plant seeds were mixed with an aqueous solution of calcium chloride with a mass concentration of 0.3% in a mass ratio of 1:4, and were soaked for 6 hours at a temperature of 35° C.

The land was ploughed to a depth of 40 cm, furrows were then dug and ridges were formed, with a ridge height of 20 cm and a ridge width of 60 cm; the green manure seeds were sown at a depth of 3 cm and a sowing rate of 9 kg/mu.

During ploughing, 25 kg/mu of a soil conditioner, 250 kg/mu of a homemade organic fertilizer, and 20 kg/mu of 15-15-15 compound fertilizer were applied into the soil. At 25 days after sowing, 10 kg/mu of potassium sulfate was applied as topdressing fertilizer. At 40 days after sowing, 35 L/mu of salt-resistant foliar fertilizer was applied by spraying.

Irrigation was conducted at 7 days after emergence with 15 $m^3$ of water/mu, and additional irrigations were carried out at 20 days and 40 days after emergence respectively, with 25 $m^3$ of water/mu.

The soil conditioner used included humic acid, phosphogypsum, biochar, and citric acid in a mass ratio of 2:1:5:2.

The salt-resistant foliar fertilizer included calcium chloride, potassium dihydrogen phosphate, ferrous sulfate, and water in a mass ratio of 1:2:0.5:1000.

At step 2, grazing was carried out when the plant height reached 45 cm, with 4 cattle/mu and 6 sheep/mu. Fresh green manure was provided to constitute 60% (v) of the daily ration of cattle and sheep, while feed accounted for 40% (v) of the daily ration. Cattle and sheep feces were collected during grazing. Grazing was terminated when the plant height was 15 cm and resumed when the plant height was 40 cm, continuing until the harvesting stage of green manure. At harvest, the straw was collected for subsequent use, and the root stubble was left in place at a height of 12 cm and returned to the soil by ploughing to a depth of 25 cm. The feed used included corn meal, soybean meal, wheat bran, and bone meal in a mass ratio of 10:2:4:2.

At step 3, green manure straw, livestock manure, calcium superphosphate, ferrous sulfate, and EM bacterial inoculant were mixed in a mass ratio of 50:50:4:2:1. The mixture was fermented at 60° C. for 25 days; during the fermentation, the pile was turned three times. When the moisture content was ≤35% and C/N was ≤50%, the fermentation was completed to obtain a homemade organic fertilizer.

At step 4, green manure crops were rotated and cattle and sheep were grazed continuously.

Test Example 1

A saline-alkali plot was selected locally, and soil samples from a depth of 0-20 cm were collected and sent to a local testing institution for testing of soil properties. The results are presented in Table 1. According to the method described in Example 1, three crops of green manure plants were planted rotationally each year (*Astragalus sinicus* in February-March, *Sesbania cannabina* in May-June, and *Lolium perenne* in September-October) for two consecutive years to improve the saline-alkali land. After soil improvement, soil samples from a depth of 0-20 cm were again collected and sent to the local testing institution for testing of soil properties. The annual yields of green manure (average yield of the three types of green manure crops) were recorded, and samples of green manure were sent to a local testing institution for determination of crude protein content (average value of the three types of green manure crops). The results are presented in Table 1.

TABLE 1

| | Before improvement | After improvement |
|---|---|---|
| Organic matter content (%) | 1.22 | 2.39 |
| Soil salinity (dS/m) | 5.32 | 1.58 |
| Total nitrogen (g/kg) | 0.67 | 2.01 |
| Rapidly available phosphorus (mg/kg) | 7.12 | 19.63 |
| Rapidly available potassium (mg/kg) | 76.09 | 168.12 |
| Green manure yield (kg/mu) | 1,357 kg/mu (first year) | 1,969 kg/mu (second year) |
| Crude protein content of green manure (%) | 16.72 (first year) | 22.03 (second year) |

As shown in Table 1, the crop-livestock soil improvement method of the present disclosure was capable of significantly reducing soil salinity, significantly increasing soil organic matter content and nutrient levels, effectively improving soil structure in saline-alkali land, and significantly increasing green manure yield. Throughout the entire improvement process, no chemical waste was discharged and the utilization rates of crop straw and livestock manure were significantly enhanced.

The foregoing description of the disclosed embodiments enables those skilled in the art to implement or use the present disclosure. Various modifications to these embodiments will be readily apparent to those skilled in the art, and the general principles defined herein may be implemented in other embodiments without departing from the spirit or scope of the invention. Thus, the present disclosure shall not be limited to the embodiments shown herein but shall conform to the widest scope consistent with the principles and novel features disclosed herein.

The invention claimed is:

1. A method for rapidly increasing organic matter in saline-alkali land by combining planting and breeding, comprising the following steps:

- step 1: ploughing and performing a land preparation, then sowing green manure plant seeds with a sowing rate of 8-10 kg/mu; during ploughing, applying a soil conditioner, a base fertilizer and 200-300 kg/mu of a homemade organic fertilizer into the soil, at 40-45 days after sowing, applying 30-40 L/mu of a salt-tolerant foliar fertilizer by spraying;
- step 2: grazing livestock when a plant height is 40-50 cm, collecting cattle and sheep feces, terminating the grazing when the plant height is 10-20 cm, and resuming when the plant grows to a height of 25-35 cm until the green manure is harvested; at harvest, collecting straw for subsequent use, and leaving a root stubble in place at a height of 10-20 cm and applying into the soil;
- step 3, mixing the green manure straw, cattle and sheep feces, calcium superphosphate, ferrous sulfate and composite bacterial agent, fermenting the mixture to obtain a homemade organic fertilizer;
- step 4, rotating green manure crops and continuing to graze livestock.

2. The method for rapidly increasing organic matter in saline-alkali land by combining planting and breeding according to claim 1, wherein the green manure plant is selected from one or more of a group consisting of *Astragalus sinicus, Vicia villosa, Trifolium* spp., *Lolium perenne, Sesbania cannabina, Medicago sativa*, and *Vulpia myuros.*

3. The method for rapidly increasing organic matter in saline-alkali land by combining planting and breeding according to claim 1, wherein the soil conditioner used in the step 1 comprises humic acid, phosphogypsum, biochar and citric acid in a mass ratio of 2:1:5:2.

4. The method for rapidly increasing organic matter in saline-alkali land by combining planting and breeding according to claim 1, wherein the salt-resistant foliar fertilizer used in the step 1 comprises calcium chloride, potassium dihydrogen phosphate, ferrous sulfate, and water in a mass ratio of 1:2:0.5:1000.

5. The method for rapidly increasing organic matter in saline-alkali land by combining planting and breeding according to claim 1, wherein in the step 1, the green manure plant seeds are mixed with a seed accelerator and soaked before sowing.

6. The method for rapidly increasing organic matter in saline-alkali land by combining planting and breeding according to claim 1, wherein in the step 1, conducting the irrigation at 7 days after emergence with 10-15 $m^3$ of water/mu, and conducting additional irrigations at 20 days and 40 days after emergence, respectively, with 20-30 $m^3$ of water/mu.

7. The method for rapidly increasing organic matter in saline-alkali land by combining planting and breeding according to claim 1, wherein the livestock described in the step 2 are cattle and sheep, with 3-5 cattle per mu and 5-7 sheep per mu.

8. The method for rapidly increasing organic matter in saline-alkali land by combining planting and breeding according to claim 1, wherein in the step 2, during grazing, the fresh green manure accounts for 60%-70% (v) of the livestock's daily ration, and the feed accounts for 30%-40% (v) of the livestock's daily ration.

9. The method for rapidly increasing organic matter in saline-alkali land by combining planting and breeding according to claim 1, wherein in the step 3, the mass ratio of the green manure straw, the livestock manure, the calcium superphosphate, the ferrous sulfate and the composite bacterial agent is 50:50:4:2:1.

10. The method for rapidly increasing organic matter in saline-alkali land by combining planting and breeding according to claim 1, wherein in the step 3, the composite bacterial agent is an EM bacterial agent.

* * * * *